(12) United States Patent
Doo et al.

(10) Patent No.: US 8,223,773 B2
(45) Date of Patent: Jul. 17, 2012

(54) OPTICAL LINE TERMINAL IN GIGABIT PASSIVE OPTICAL NETWORK AND METHOD FOR TRANSMITTING BROADCAST FRAME USING THE SAME

(75) Inventors: Kyeong-hwan Doo, Daejeon-si (KR); Bin-yeong Yoon, Daejeon-si (KR); Dong-soo Lee, Gwangju-si (KR)

(73) Assignee: Electronics and Telecommunications Research Institute (KR)

( * ) Notice: Subject to any disclaimer, the term of this patent is extended or adjusted under 35 U.S.C. 154(b) by 365 days.

(21) Appl. No.: 12/606,078

(22) Filed: Oct. 26, 2009

(65) Prior Publication Data
US 2010/0135660 A1 Jun. 3, 2010

(30) Foreign Application Priority Data

Nov. 28, 2008 (KR) .................. 10-2008-0119791
Feb. 27, 2009 (KR) .................. 10-2009-0017029

(51) Int. Cl.
*H04L 12/28* (2006.01)
(52) U.S. Cl. ....................... 370/395.5; 398/45
(58) Field of Classification Search .................. None
See application file for complete search history.

(56) References Cited

U.S. PATENT DOCUMENTS

| 7,599,353 | B2 | 10/2009 | Kim et al. | |
|---|---|---|---|---|
| 7,684,403 | B2* | 3/2010 | Kim et al. | 370/392 |
| 7,860,121 | B2 | 12/2010 | Chen | |
| 2004/0213286 | A1* | 10/2004 | Jette et al. | 370/466 |
| 2006/0039390 | A1* | 2/2006 | Boyd et al. | 370/404 |
| 2008/0198857 | A1 | 8/2008 | Kim et al. | |
| 2008/0267634 | A1* | 10/2008 | Effenberger | 398/128 |
| 2008/0304828 | A1* | 12/2008 | Mizutani et al. | 398/78 |
| 2009/0208204 | A1* | 8/2009 | Zhang et al. | 398/25 |
| 2010/0150554 | A1* | 6/2010 | Mizutani et al. | 398/58 |

FOREIGN PATENT DOCUMENTS

| JP | 2011502400 A | 1/2011 |
|---|---|---|
| KR | 1020040107548 A | 12/2004 |
| KR | 10-0617725 | 8/2006 |

* cited by examiner

*Primary Examiner* — Phirin Sam
(74) *Attorney, Agent, or Firm* — Blakely, Sokoloff, Taylor & Zafman

(57) ABSTRACT

Disclosed are an optical line terminal in a gigabit passive optical network and a method for transmitting a broadcast frame using the same. The optical line terminal allocates second port identifiers to optical network units such that a broadcast frame is prevented from being retransmitted to an optical network unit which has transmitted the broadcast frame to the optical line terminal.

10 Claims, 3 Drawing Sheets

OPTICAL LINE TERMINAL IN GIGABIT PASSIVE OPTICAL NETWORK AND METHOD FOR TRANSMITTING BROADCAST FRAME USING THE SAME

CROSS-REFERENCE TO RELATED APPLICATION

This application claims the benefit under 35 U.S.C. §119(a) of Korean Patent Applications No. 10-2008-0119791, filed on Nov. 28, 2008 and No. 10-2009-0017029, filed on Feb. 27, 2009, the disclosures of which are incorporated by reference in its entirety for all purposes.

BACKGROUND

1. Field

The following description relates to a GPON (Gigabit-capable Passive Optical Network) technology, and more particularly, to an optical line terminal in a GPON and a method for transmitting a broadcast frame using the same.

2. Description of the Related Art

A GPON (Gigabit-capable Passive Optical Network) provides a subscriber with a large bandwidth and supports various kinds of multicasting protocols. The GPON is a type of FTTH (fiber to the home) service standardized through ITU-T (International Telecommunication Union Telecommunication Standardization Sector) and has an architecture in which a plurality of ONTs (optical network terminal) also called as OUNs (optical network unit) are connected to an OLT (optical line terminal) through passive components in a point-to-multipoint scheme.

The optical line terminal is a multiservice device for connecting an optical network to another system and includes an SIPP (service interface and protocol processing) device, a CATV (cable television) device, a transmission device and a network management system. The ONT and ONU serve as a network terminator used for connection with respect to a fiber-to-the user system configuring a next generation network. The ONT or ONU converts a communication interface, such as a user network interface of a narrow-band integrated services digital network and a user network interface of a broadband integrated services digital network, or a video signal interface, thereby achieving an access to a fiber optic network.

SUMMARY

Accordingly, in one aspect, there is provided an optical line terminal in a GPON capable of retransmitting a broadcast frame downstream without having to manage an Ethernet address and an IP address and a method for transmitting a broadcast frame using the same.

In one aspect, there is provided an identifier table and a controller. The identifier table stores $1^{st}$ PIDs and $2^{nd}$ PIDs which are allocated to a plurality of optical network units. The $2^{nd}$ PIDs prevents a broadcast frame from being retransmitted to an optical network unit which has transmitted the broadcast frame. When receiving a broadcast frame from an optical network unit, the controller changes $1^{st}$ PID of the broadcast frame into an the $2^{nd}$ PID matching the port identifier with reference to the identifier table, thereby configuring a broadcast frame including the $2^{nd}$ PID and transmitting the broadcast frame including the $2^{nd}$ PID to the optical network unit.

In another general aspect, there is provided a method of transmitting a broadcast frame in an optical line terminal for a gigabit-capable passive optical network. The method is performed as follows. First, a upstream frame is received from optical network units to the optical line terminal. A $1^{st}$ PID of the upstream broadcast frame is changed into a $2^{nd}$ PID matching the $1^{st}$ PID with reference to an identifier table storing port identifiers and $2^{nd}$ PIDs allocated to optical network units to configure a frame including the $2^{nd}$ PID. The frame including the $2^{nd}$ PID is transmitted to the optical network unit downstream. The $2^{nd}$ PID is registered in the optical network units and serves to prevent the upstream frame from being retransmitted to the optical network unit which has transmitted the upstream frame.

In another general aspect, there is provided an information storage medium storing a data structure of an optical line terminal for a gigabit-capable passive optical network. The information storage medium includes $2^{nd}$ PIDs, which are allocated to the optical network units such that a broadcast frame is prevented from being retransmitted to an optical network unit, which has transmitted the broadcast frame to the optical line terminal.

An exemplary optical line terminal of a GPON allocates and manages $2^{nd}$ PIDs such that a broadcast frame is prevented from being retransmitted into an optical network unit which has transmitted the broadcast frame. Accordingly, the broadcast frame can be retransmitted downstream without requiring an Ethernet address and an IP address to be managed.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of to well-known functions and structures are omitted to enhance clarity and conciseness.

Figure 1:
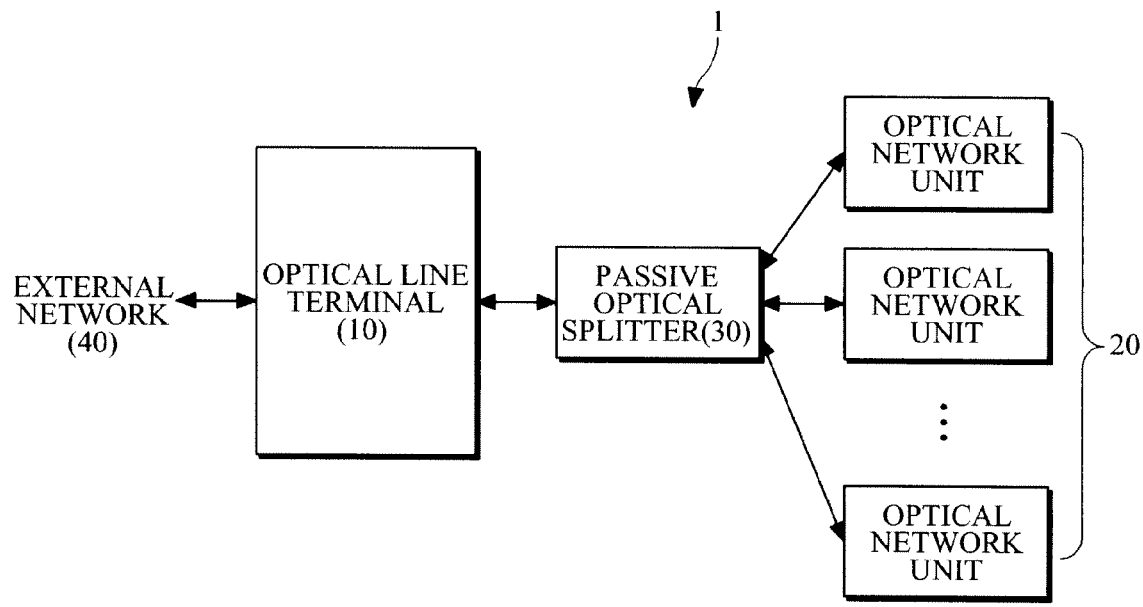
FIG. 1 is a view illustrating an exemplary GPON (Gigabit-capable Passive Optical Network)

FIG. 1 is a view illustrating an exemplary GPON (Gigabit-capable Passive Optical Network).

As shown in FIG. 1, a passive optical network (PON) connects an optical line terminal (OLT) 10 installed in a telephone office to optical network units (ONU) 20 also called optical network terminals (ONT) installed in a home through a passive optical splitter 30 in a point to multi-points scheme. A downstream transmission from the optical line terminal 10 to the optical network unit 20 is performed through a broadcast transmission scheme allowing all packets to be transmitted to the optical network unit 20.

However, a upstream transmission from the optical network units 20 to the optical line terminal 10 is performed by sharing a single optical link with a plurality of optical network units 20 based on various medium access control schemes. As an example of the medium access control schemes, a TDMA (Time Division Multiple Access)-PON uses the TDMA scheme allowing access to the medium only at limited times allowed by the optical line terminal 10. The GPON (Gigabit-Capable Passive Optical Network) is classified as a TDMA-PON.

Figure 2:
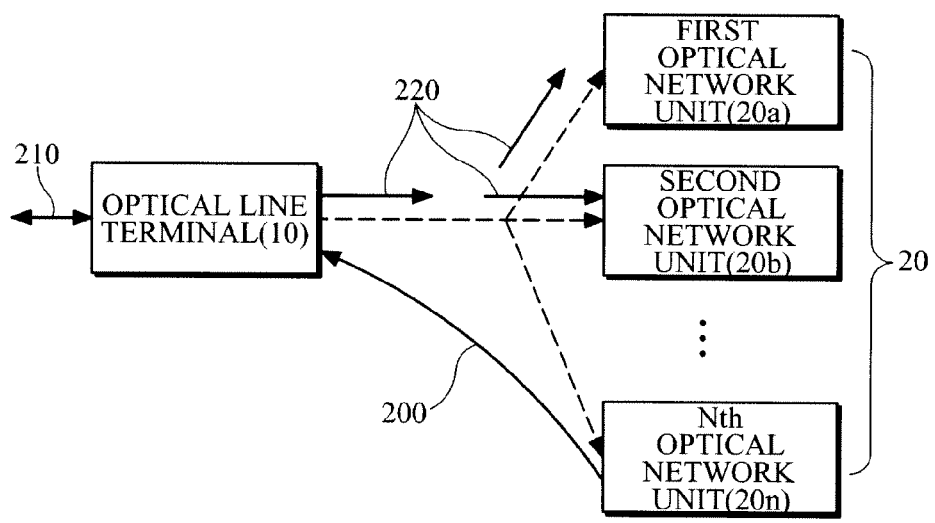
FIG. 2 is a view illustrating a upstream frame transmission over an exemplary optical line terminal.

FIG. 2 is a view illustrating a upstream frame transmission over an exemplary optical line terminal.

As shown in FIG. 2, a broadcast frame such as an ARB packet needs to be output through ports except for a port of an Ethernet switch which has transmitted the broadcast frame. When transmitting a broadcast frame in the GPON, two transmission paths are considered based on a transmission direction.

In one case involving two transmission paths, frames input from a downstream external network need to be transmitted to all of optical network units 20a, 20b and 20c. Since the PON system allows the frames transmitted to be broadcasted downstream, the frames are easily to transmitted to all of the optical network units 20a, 20b and 20c using a port identifier (PID) for broadcast.

In another case involving two transmission paths, frames are input from the optical network units 20a, 20b and 20c. As shown in FIG. 2, if an $n^{th}$ optical network unit 20n transmits a broadcast frame upstream (200), the optical line terminal 10 transmits the received broadcast frame to an external network of the optical line terminal 10 in addition to the first optical network unit 20a and the second optical network unit 20b that are connected to the optical line terminal 10 (210 and 220). However, in this case, the broadcast frame is transmitted to the $n^{th}$ optical network unit 20n which transmitted the broadcast frame, as a result, an Ethernet switch provided in the $n^{th}$ optical network unit 20n receives the broadcast frame, and thus an output port of the $n^{th}$ optical network unit 20n receives the frame which has been transmitted from the $n^{th}$ optical network unit 20n.

In the conventional GPON, an optical line terminal or a higher router manages an Ethernet frame address and an IP address related to the optical network unit. In addition, in order that the upstream broadcast frame is transmitted only to a destination optical network unit, the optical line terminal or the higher router adds a port identifier corresponding to the destination optical network unit to a frame. In this regard, in order for the optical line terminal to operate normally, a network layer and a data link layer need to have a frame processing function determining port identifiers. However, the management of the Ethernet frame address and the IP address is a very complicated and difficult process.

According to the present invention, the optical line terminal 10 allocates a port identifier to optical network units. The port identifier serves to prevent a broadcast frame from being retransmitted to an optical network unit, which has transmitted the broadcast frame to the optical line terminal regardless of the Ethernet frame address and the IP address while satisfying GPON standards. Such a port identifier is not additionally specified, and represents some of port identifiers specified in GPON. In this regard, hereinafter, the port identifier serving to prevent a broadcast frame from being transmitted to a predetermined optical network unit will be referred to as a second port identifier ($2^{nd}$ PID) to differentiate from some port identifiers which allow a predetermined port to be addressed, and the port identifiers for addressing a predetermined port to a predetermined port will be referred to as a first port identifier ($1^{st}$ PID). Accordingly, is after the optical line terminal receives a upstream broadcast frame from a predetermined optical network unit, the optical line terminal retransmits a broadcast frame to all of optical network units except for the optical network unit which has transmitted the broadcast frame.

Figure 3:
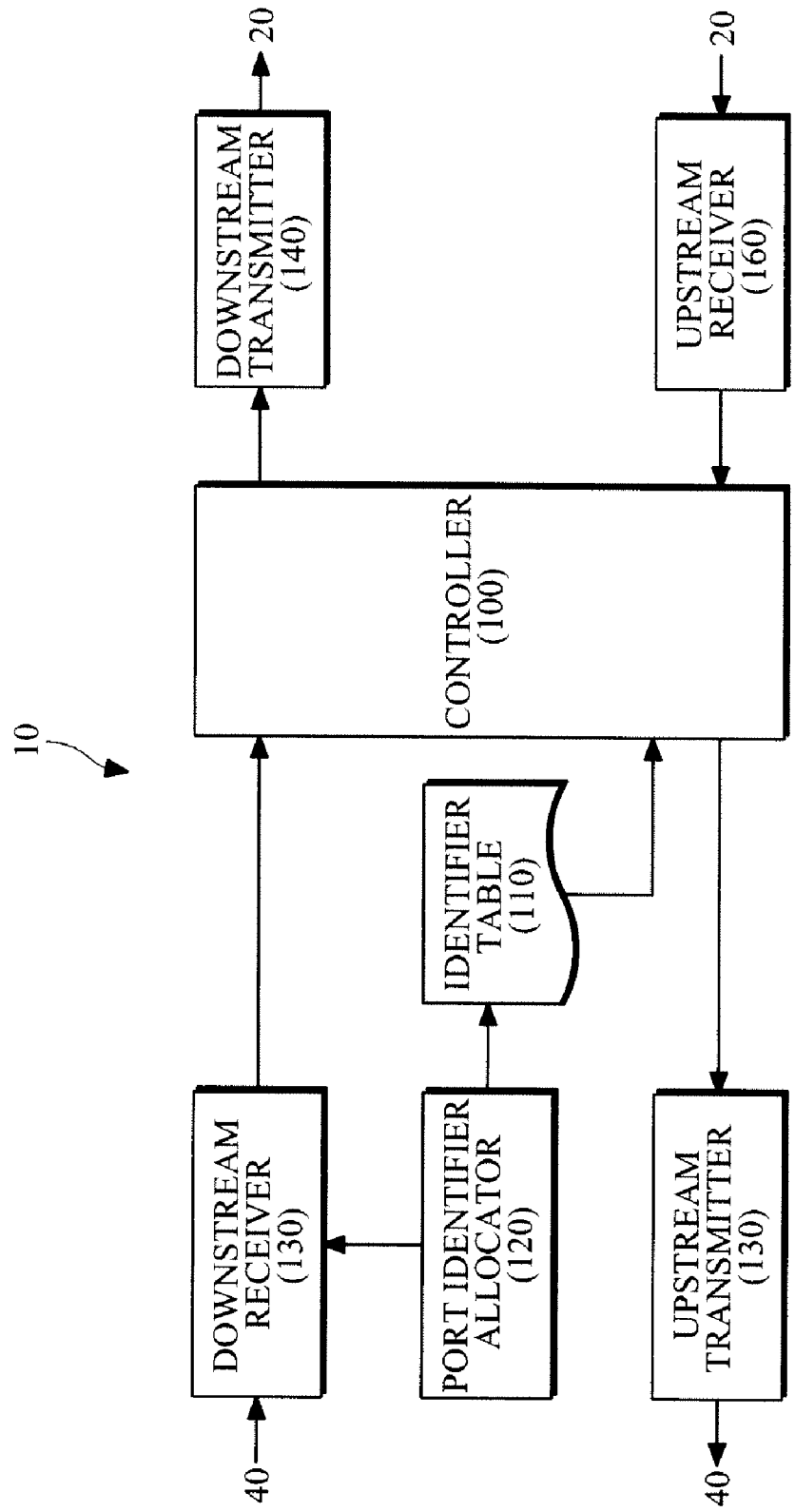
FIG. 3 is a block diagram illustrating the exemplary optical line terminal.

FIG. 3 is a block diagram illustrating the exemplary optical line terminal. As shown in FIG. 3, the optical line terminal 10 includes an identifier table 110, a controller 100, a downstream receiver 130, a downstream transmitter 140, a upstream transmitter 150 and a upstream receiver 160. The optical line terminal 10 further includes a port identifier allocator 120.

The identifier table 110 stores the $1^{st}$ PID and the $2^{nd}$ PID that are allocated to the optical network units. As described above, the $1^{st}$ PID is an identifier registered in optical network units to identify an optical network unit which has transmitted a frame to the optical line terminal, and the second port identifier is an identifier which is allocated to the optical network units such that a broadcast frame is prevented from being retransmitted to an optical network unit, which has transmitted the broadcast frame.

The controller 100 receives a broadcast frame from an optical network unit, and changes a $1^{st}$ PID of the broadcast frame into a $2^{nd}$ PID matching the PID with reference to the identifier table 110, thereby configuring a broadcast frame. The broadcast frame is provided to optical network units. That is, the controller 100 transmits the broadcast frame to optical network units except for the optical network unit which has transmitted the broadcast frame by using the $2^{nd}$ PID.

Meanwhile, the downstream receiver 130 receives an Ethernet frame from an external network, and adds the $1^{st}$ PID allocated through the port identifier allocator 120 to the received Ethernet frame, thereby changing the Ethernet frame into a GPON Encapsulation Method frame (GEM).

The downstream transmitter 140 performs GPON related MAC (Media Access Control) functions required to transmit a broadcast frame to the optical network unit, and generates and manages a GTC (GPON Transmission Convergence layer) frame.

The upstream transmitter 150 converts the GEM frame transmitted from the optical network unit into an Ethernet frame and then transmits the Ethernet frame to the external network.

The upstream receiver 160 performs a GPON-MAC function of extracting the GTC frame and the GEM frame that are received from the optical network unit.

Meanwhile, the port identifier allocator 120 allocates and manages identifiers used in the GPON system. At the most 4,096 ($2^{12}$) identifiers can be used in the GPON. The identifiers can be used for various purposes relating to a multicast frame, a broadcast frame, an OMCI GEM frame or a general bi-directional data frame.

The optical line terminal allocates port identifiers to optical network units whenever a system is initiated or an optical network unit is newly added in a system. After that, the optical network unit divides the port identifiers by frame and transmits the divided port identifier inside a port identifier region of a header of the GEM frame to the optical line terminal. As described above, the optical network unit transmits a predetermined port identifier, which is selected from the port identifiers allocated by the optical line terminal, inside the frame header. Accordingly, the optical line terminal can easily identify the optical network unit which has transmitted the frame.

$2^{nd}$ PIDs are allocated in a region which does not overlap with a region of the $1^{st}$ PID to within a number range of 4K preset in the GPON, and allocated corresponding to the number of optical network units in operation. As described above, the $2^{nd}$ PIDs are systematically selected from identifiers which are preset in the GPON, and thus satisfy GPON standards.

The optical line terminal allocates the $2^{nd}$ PIDs corresponding to the number of optical network units connected to a network. In addition, $2^{nd}$ PIDs s except for its own $2^{nd}$ PIDs are is registered in each optical network unit.

For example, on the assumption that eight optical network units are connected to an optical line terminal, eight $2^{nd}$ PIDs specified from $2^{nd}$ PID 0 to $2^{nd}$ PID 7 are determined. If the eight optical network units are referred to as from an optical network unit 0 to optical network unit 7, $2^{nd}$ PID 1 to $2^{nd}$ PID 7 except for $2^{nd}$ PID 0 are registered in the optical network unit 0. $2^{nd}$ PID 0 to $2^{nd}$ PID 7 except for $2^{nd}$ PID 1 are registered in the optical network unit 1. In such a manner, $2^{nd}$ PIDs are registered in the optical network units, so that a predetermined optical network unit has seven $2^{nd}$ PIDs except for a $2^{nd}$ PID allocated to the predetermined optical network unit.

The exemplary optical network unit accepts or discards a downstream stream transmitted from the optical line terminal with reference to a port identifier table where port identifiers of the downstream frame are registered. If the optical line terminal receives a frame having a $2^{nd}$ PID 3, which is not registered in an optical network unit 3, the frame is transmitted to all optical network units except for the optical network unit 3.

Figure 4:
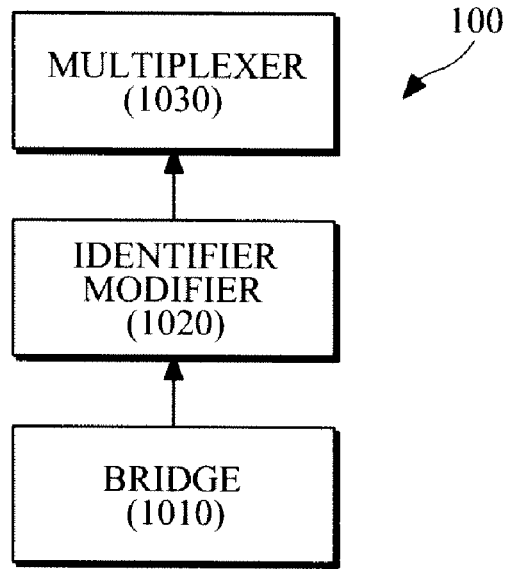
FIG. 4 is a block diagram illustrating an exemplary controller shown in FIG. 3.

FIG. 4 is a block diagram illustrating a controller shown in FIG. 3. As shown in FIG. 4, the controller 100 includes a bridge 1010, an identifier modifier 1020 and a multiplexer 1030.

The bridge 101 determines whether a upstream frame received from the optical network unit is a broadcast frame. If the upstream frame is not a broadcast frame, the bridge 1010 transmits the frame to the upstream transmitter (150, in FIG. 3). If the upstream frame is a broadcast frame, the bridge 1010 simultaneously transmits the frame to the upstream transmitter (150, in FIG. 3) and to the identifier modifier 1020 to be described later such that the frame is retransmitted downstream.

Meanwhile, the identifier modifier 1020 registers and searches for the $2^{nd}$ PID s used to retransmit the broadcast frame, which have been transmitted from the optical network unit. Since the optical line terminal allocates $1^{st}$ PIDs to optical network units, the $1^{st}$ PID of the is broadcast frame indicates a predetermined optical network unit which has transmitted the broadcast frame. In addition, a $2^{nd}$ PID corresponding to the optical network unit, which has transmitted the broadcast frame, can be identified based on a relation between $1^{st}$ PID and 2nd PID (120, in FIG. 2).

The optical line terminal records data on $2^{nd}$ PID s in the identifier table (110, in FIG. 3), $1^{st}$ PID s serving as addresses. For example, when four optical network units are operated, the optical network units are specified as an optical network unit0 (ONU0), an optical network unit1 (ONU1), an optical network unit2 (ONU2), and an optical network unit3 (ONU3) as described in table 1. In addition, port identifiers are allocated to the optical network unit0 (ONU0), the optical network unit1 (ONU1), the optical network unit2 (ONU2) and the optical network unit3 (ONU3), respectively.

TABLE

| Port ID | ONU | | | |
|---|---|---|---|---|
| | ONU0 | ONU1 | ONU2 | ONU3 |
| $2^{nd}$ PID | 100 ($2^{nd}$ PID 0) | 101 ($2^{nd}$ PID 1) | 102 ($2^{nd}$ PID 2) | 103 ($2^{nd}$ PID 3) |
| $1^{st}$ PID | 201~210 | 301~310 | 401~410 | 501~510 |

As shown in table 1, in the $1^{st}$ PID-$2^{nd}$ PID table, the $1^{st}$ PID represents an address and the $2^{nd}$ PID corresponds to table data. If a broadcast frame transmitted from an optical network unit has a $1^{st}$ PID of 405, which corresponds to a port identifier of the optical network unit2 (ONU2), a $2^{nd}$ PID matching the $1^{st}$ PID of 405 is 102. The optical line terminal changes the $1^{st}$ PID of 405 to the $2^{nd}$ PID of 102 and retransmits the frame having the $2^{nd}$ PID of 102 to optical network units. As a result, the broadcast frame, which has been transmitted from the optical network to unit 2 ONU2, is retransmitted to all optical network units ONU0, ONU1 and ONU3 except for the optical network unit2 ONU2 having the $2^{nd}$ PID 102.

Meanwhile, the multiplexer 1030 performs multiplexing on a broadcast frame to be retransmitted downstream to the optical network unit. The amount of the broadcast frame, which is transmitted from the external network and then transmitted downward, is small and is does not substantially exert influence on the downstream transmission. Accordingly, the broadcast frame provided from the external network can be output prior to a frame, which is transmitted from the optical network unit upstream, without degrading the overall downstream operation.

Figure 5:
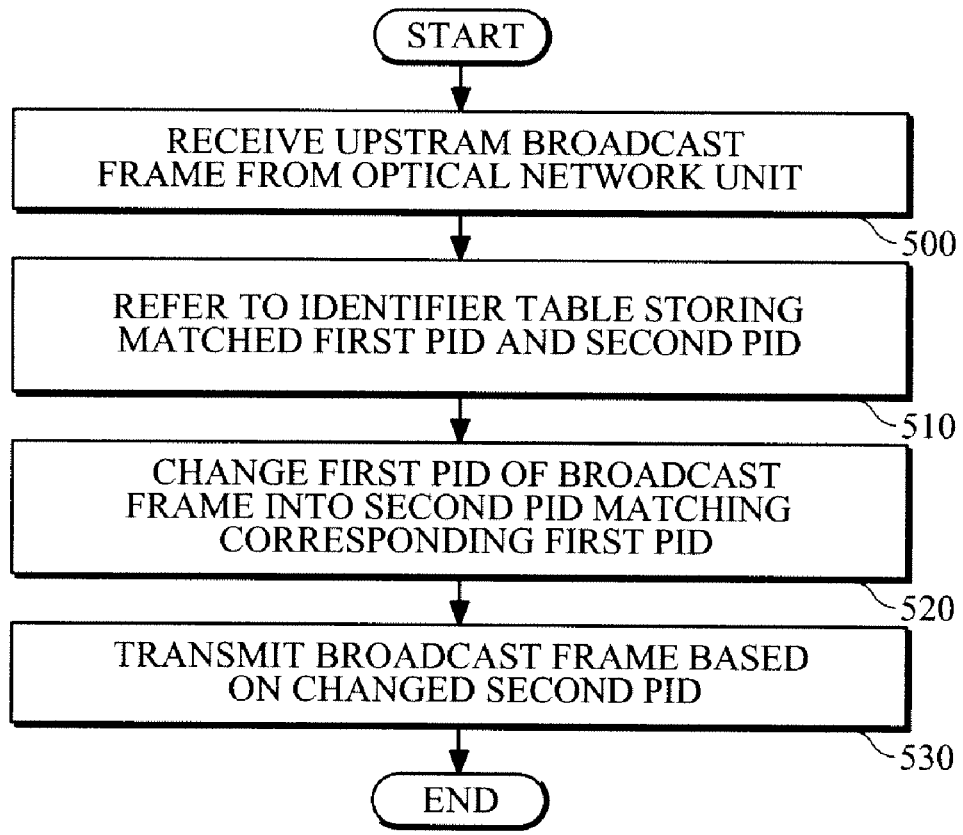
FIG. 5 is a flow chart illustrating an exemplary method of transmitting a upstream frame over the optical line terminal.

FIG. 5 is a flow chart illustrating an exemplary method of transmitting a upstream frame over an optical line terminal.

As shown in FIG. 5, the optical line terminal receives a upstream broadcast frame from an optical network unit (operation 500). After that, the optical line terminal refers to an identifier table storing $1^{st}$ PIDs and $2^{nd}$ PIDs (operation 510).

Then, the optical line terminal configures a broadcast frame by changing a $1^{st}$ PID of the broadcast frame into a $2^{nd}$ PID matching the $1^{st}$ PID of the broadcast frame (operation 520). Further, the broadcast frame may be multiplexed.

The optical line terminal transmits the broadcast frame to the optical network unit in consideration of the $2^{nd}$ PID changed from the $1^{st}$ PID (operation 530).

According to the present invention, the optical line terminal allocates and manages $2^{nd}$ PIDs such that a predetermined $2^{nd}$ PID is allocated to all optical network units except for a predetermined optical network unit having the predetermined $2^{nd}$ PID. Therefore, in a GPON MAC (medium access control) chip, a broadcast frame can be retransmitted downstream without requiring an Ethernet address and an IP address to be managed.

A number of exemplary embodiments have been described above. Nevertheless, it will is be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical line terminal for a gigabit-capable passive optical network, the optical line terminal comprising:
   an identifier table to store first port identifiers and second port identifiers which are allocated to a plurality of optical network units, in which the second port identifier prevents a broadcast frame from being retransmitted to an optical network unit which has transmitted the broadcast frame; and a controller to change, when receiving a broadcast frame from an optical network unit, a first port identifier of the broadcast frame into a second port identifier matching the first port identifier with reference to the identifier table to configure a broadcast frame including the second port identifier and transmit the broadcast frame including the second port identifier to the optical network unit.

2. The optical line terminal of claim 1, wherein the controller includes:

a bridge to determine whether a upstream frame received from the optical network unit is a broadcast frame and perform switching the upstream frame;

an identifier modifier to change the first port identifier of the broadcast frame into the second port identifier matching the first port identifier, thereby configuring the broadcast frame including the second port identifier; and a multiplexer to perform multiplexing on the broadcast frame including the second port identifier, thereby controlling downstream transmission.

3. The optical line terminal of claim 1, further comprising a port identifier allocator to allocate the first port identifiers and the second port identifiers to the optical network units.

4. The optical line terminal of claim 3, wherein the port identifier allocator allocates the second port identifiers to the optical network units based on the number of the optical network units and wherein the port identifier allocator registers remaining of the second port identifiers except for a second port identifier, which is allocated to a predetermined optical network unit, in the predetermined optical network unit.

5. The optical line terminal of claim 3, wherein the first port identifier and the second port identifier are allocated in different fields to prevent the first port identifier and the second port identifier from overlapping each other.

6. The optical line terminal of claim 1, wherein the controller transmits the broadcast frame to all optical network units except for the optical network unit which has transmitted the broadcast frame by use of the second port identifier.

7. A method of transmitting a broadcast frame in an optical line terminal for a gigabit-capable passive optical network, the method comprising:

receiving a upstream frame from an optical network unit;

changing a first port identifier of the upstream frame into a second port identifier matching the first port identifier with reference to an identifier table storing first port identifiers and second port identifiers that are allocated to optical network units to configure a frame including the second port identifier; and transmitting the frame including the second port identifier downstream, wherein the second port identifier is registered in the optical network unit to prevent the upstream frame from being retransmitted to the optical network unit which has transmitted the upstream frame.

8. The method of claim 7, wherein the configuring of the frame by changing the first port identifier into the second port identifier includes:

determining whether the upstream frame received from the optical network unit is a broadcast frame and performing switching on the upstream frame based on the result of determination;

if the upstream frame is a broadcast frame, changing a first port identifier of the broadcast frame into a second port identifier matching the first port identifier to transmit a broadcast frame including the $2^{nd}$ PID to the optical network unit;

multiplexing on the broadcast frame including the second port identifier, thereby controlling downstream transmission.

9. The method of claim 7, further comprising allocating the first port identifiers and the second port identifiers to the optical network units.

10. The optical line terminal of claim 9, wherein, the allocating of the first port identifiers and the second port identifiers comprises:

allocating the second port identifiers based on the number of the optical network units; and registering remaining of the second port identifiers allocated to the optical network units except for a second port identifier allocated to a predetermined optical network unit in the predetermined optical network unit.

* * * * *